United States Patent
Moon et al.

[19]

[11] Patent Number: 5,966,469
[45] Date of Patent: Oct. 12, 1999

[54] SEQUENTIAL POLYGON APPROXIMATION APPARATUS FOR CONTOUR AND METHOD THEREOF

[75] Inventors: Joo - Hee Moon; Jae - Won Chung; Jae - Kyoon Kim, all of Seoul, Rep. of Korea

[73] Assignee: Hyundai Electronics Industries Co., Ltd., Kyounggi-do, Rep. of Korea

[21] Appl. No.: 08/740,291

[22] Filed: Oct. 25, 1996

[30] Foreign Application Priority Data

Oct. 26, 1995 [KR] Rep. of Korea ................... 95-37915

[51] Int. Cl.⁶ ................................................. G06K 9/36
[52] U.S. Cl. ........................ 382/241; 382/199; 382/242; 382/201; 382/203
[58] Field of Search .................................. 382/199, 241, 382/242, 266, 203, 201

[56] References Cited

U.S. PATENT DOCUMENTS

| | | | |
|---|---|---|---|
| 4,783,829 | 11/1988 | Miyakawa et al. | 382/22 |
| 4,821,210 | 4/1989 | Rumbaugh | 364/518 |
| 4,853,971 | 8/1989 | Nonura | 382/56 |
| 5,214,754 | 5/1993 | Okamoto et al. | 395/142 |

*Primary Examiner*—Leo H. Boudreau
*Assistant Examiner*—Kanji Patel
*Attorney, Agent, or Firm*—McAulay Nissen Goldberg Kiel & Hand, LLP

[57] ABSTRACT

A sequential polygon approximation apparatus for a contour and a method thereof which are capable of sequentially extracting a vertex in the order of a contour pixel when performing a polygon approximation so as to code a shape information, which includes an error computation unit for obtaining a contour pixel between two contour pixels of the vertex extraction unit from the contour pixel memory and computing an error which is a distance between a straight line between two contour pixels and a pixel from the contour pixel memory, a comparison unit for comparing an error obtained by the error computation unit with a threshold value, and a controller for controlling the vertex extraction unit and the error computation unit in accordance with the comparison result of the comparison unit, setting the pixel just before the final pixel of a first region as a first vertex when the error obtained in the first region which is the region of the contour pixel sequentially determined for the vertex extraction from a fixed one vertex is greater than a given threshold value, outputting the final pixel of a second region as a final vertex when all the errors obtained in the second region which is expanded till a predetermined contour pixel from the first region is smaller than the given threshold value, and outputting the first vertex as the final vertex.

9 Claims, 6 Drawing Sheets

SEQUENTIAL POLYGON APPROXIMATION APPARATUS FOR CONTOUR AND METHOD THEREOF

BACKGROUND OF THE INVENTION

1. Field of the Invention

The present invention relates to a sequential polygon approximation apparatus for a contour and a method thereof, and particularly to an improved sequential polygon approximation apparatus for a contour and a method thereof which are capable of sequentially extracting a vertex in the order of a contour pixel when performing a polygon approximation so as to code a shape information.

2. Description of the Conventional Art

As an international coding standard, there are MPEG-1, MPEG-2, H.261, etc. These coding standards are directed to using a block based coding technique such as a discrete cosine transform (DCT). The motion compensation is processed by the block unit of each image frame with respect to a moving object.

Since the above-described block based coding technique is directed to performing a coding with respect to the entire frames, the amount of the generated information is increased, and it is impossible to transmit a motion picture signal through a channel such as a public telephone network or a wireless communication network which are very slow to communicate to each other, for thus degrading the picture quality.

In order to overcome the above-described problems, an object-oriented coding technique which is not a block based technique has been studied in the industry. An effective coding method of a shape information (a contour) of an object is needed.

The conventional techniques for decreasing the amount of the shape information with respect to the moving object according to the vertex-based coding are as follows.

There are an article "Predictive contour coding for an object-oriented analysis synthesis coder", IEEE International Symposium Information Theory, San Diego, Calif., U.S.A, January 1990, at page 75, made by M. Hotter, and an article "Object-oriented analysis synthesis at low bit rates", IEEE Transaction on Circuits and system for Video Technology, Special Issue on very low-bit rate video coding, vol 4, No. 3, June 1994, at pages 228 through 235.

In accordance with the above-described techniques, the entire contours of the moving object region are approximated, and the motion compensation of the vertexes used for the approximation is predicted, and the error thereof is transmitted.

However, in accordance with the conventional method which is directed to considering the entire shape information, the amount of the entire data which is transmitted is great, for thus degrading the picture quality.

In addition, the polygon approximation method which is directed to approximately expressing the contour of the moving object is used for an object recognition, an image analysis, an image coding, etc, and the applicable range thereof becomes wider.

In particular, since the image coding considering the object or content becomes a major technique for MPEG-4 based on the concept of a video object plane (VOP), the polygon approximation method becomes one of important methods of the shape information together with the shape information transmission of an object.

FIGS. 1A through 1D are views illustrating a conventional polygon approximation process.

Figure 1A:
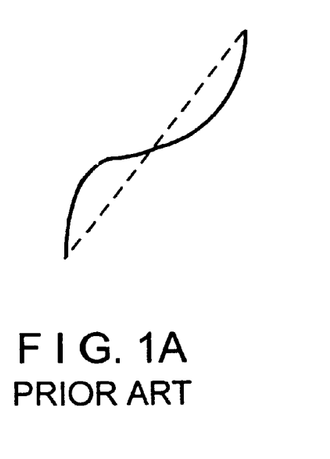
FIGS. 1A through 1D are views illustrating a conventional polygon approximation process.

First, when there is given an open contour, namely, both ends of the contour are not connected, as shown in FIG. 1A both ends thereof are connected to each other.

Figure 1B:
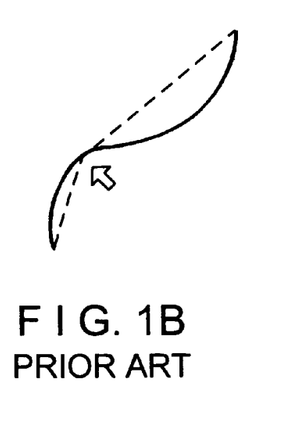

In addition, as shown in FIG. 1B, the points in which the distance to a pixel forming a contour in the vertical direction with respect to a straight line is the maximum are computed as a new vertex, and a new vertex is connected to the respective two end points by a straight line.

Figure 1C:
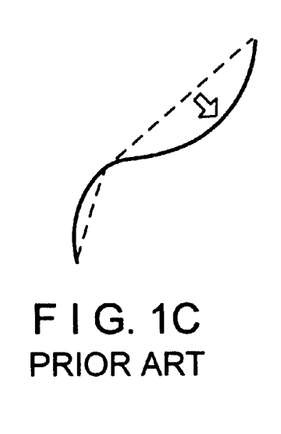
Figure 1D:
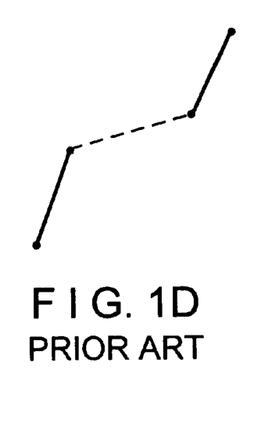

As shown in FIG. 1C, the straight lines are repeatedly connected until the maximum distance to the contour pixel in the vertical direction with respect to the straight line becomes smaller than the threshold value (hereinafter, referred to 'thr-dmax', and finally a polygonal straight line is obtained as shown in FIG. 1D.

In addition, if the contour is closed, two pixels in which the straight line among the pixels are the maximum are connected. In addition, in the case of the open contour, the above-described processes are repeated, for thus obtaining a polygonal straight line.

Here, the threshold value is given as the maximum error between the contour and the polygonal straight line which are permitted during the polygonal approximation for the contour.

However, in the conventional polygonal approximation, the maximum error in each polygonal straight line range is generated when the maximum error is smaller than the threshold value. In addition, the number of vertexes are disadvantageously increased due to the above-described intervals.

In addition, since the above-described problems increase the amount of the data to be transmitted in the image coding method which is directed to transmitting the position information of the vertex, for thus lowering the coding gain.

SUMMARY OF THE INVENTION

Accordingly, it is an object of the present invention to provide a sequential polygon approximation apparatus for a contour and a method thereof which are capable of reducing the number vertex by sequentially extracting a vertex in the order of a contour pixel when performing a polygon approximation so as to code a shape information.

It is another object of the present invention to provide a sequential polygon approximation apparatus for a contour and a method thereof which are capable of reducing the amount of the data to be transmitted in the image coding by reducing the number of vertexes, thus improving the coding gain.

To achieve the above objects, there is provided a sequential polygon approximation apparatus for a contour which includes a contour extraction unit for extracting a contour from shape information of an input image signal; a contour pixel memory for storing position information of a contour pixel in the order of a connection of the contour extracted by the contour extracting unit; a vertex extraction unit for receiving the contour pixel from the contour pixel memory and outputting two contour pixels which are necessary to draw a virtual straight line; an error computation unit for receiving from the contour pixel memory a contour pixel between the two contour pixels outputted from the vertex extraction unit, and computing a distance between the inputted contour pixel and the virtual straight line between the two contour pixels outputted from the vertex extracting unit; a comparison unit for comparing a distance obtained by the error computation unit and a threshold value provided by an user; a controller for controlling the vertex extraction unit and the error computation unit according to a comparison result of the comparison unit, setting a pixel just before a final pixel of a first region as a first vertex when a distance obtained in the first region is than the threshold value, setting a corresponding contour pixel as the final vertex when distances obtained in a second region are a smaller than or equal to the threshold value, and setting the first vertex as the final vertex when any of the distances obtained in the second region is not smaller than or equal to the threshold value; and a vertex memory for storing the vertexes set by the controller. To achieve the above objects, in accordance with a first embodiment of the present invention there is provided a sequential polygon approximation method for a contour which includes a first step for determining a first vertex by carrying out an initialization; a second step for determining whether a pixel inputted from a contour pixel memory to a vertex extraction unit is a final pixel, after the initialization; a third step for finishing a polygon approximation when the pixel is the final pixel in the second step, or receiving from the contour pixel memory the contour pixel positioned after two contour pixels from the first vertex which is determined in the first step; a fourth step for drawing a virtual straight line between the contour pixel inputted in the third step and the first vertex; fifth step for receiving a contour pixel between the first vertex determined in the first step and the contour pixel inputted from the contour pixel memory in the third step, and computing a distance between the inputted contour pixel and the virtual straight line drawn in the third step; a sixth step for confirming whether the polygon approximation that has been carried out in respect of a first region or a second region; a seventh step for comparing the distance computed in the fifth step with the threshold value by the comparison unit when the polygon approximation relates to the first region; an eight step for receiving a next succeeding contour pixel from the contour pixel memory and repeatedly carrying out the above steps from the fourth step when the distance is smaller than or equal to the threshold value in the seventh step, and determining as the first vertex a contour pixel just before the pixel connected to the first vertex by the straight line and defining a second region including contour pixels between a pixel position of the first vertex and a predetermined contour pixel from the first vertex, when the distance is greater than the threshold value; a ninth step for inputting the final pixel of the second region from the contour pixel memory to the vertex extraction unit when the polygon approximation relates to the second region in the sixth or eight step; a tenth step for drawing a virtual straight line between the first pixel inputted in the ninth step and the first vertex of the first region; an eleventh step for receiving from the contour pixel memory all contour pixels between the first vertex of the first region and the final contour pixel inputted from the contour pixel memory in the tenth step, and computing a distance between the inputted contour pixels and the virtual straight line drawn in the tenth step by the error computation unit, a twelfth step for comparing the distance computed by the comparison unit in the ninth step with the threshold value; and a tenth step for receiving from the contour pixel memory a pixel just before the final pixel of the second region when any of the distances is greater than the threshold value, and repeatedly carrying out the above steps from the tenth step, determining as the final vertex a pixel of the second region connected to the first vertex by a straight line when the distances are all smaller than or equal to the threshold value, and determining the first vertex of the first region as the final vertex and storing it in the vertex memory when any of the distances to the first vertex is not smaller than or equal to the threshold value. In the sequential polygon approximation apparatus for the contour and the method thereof according to the present invention, the threshold value is determined as an allowable maximum distance between the real contour and polygon straight line, or provided as a number of the contour vertexes.

In the sequential polygon approximation apparatus for the contour and the method thereof according to the present invention, when the given contour is opened, one end point thereof is determined as the first vertex, and when the given contour is closed, a predetermined pixel of the pixels forming the contour is determined as the first vertex.

In the sequential polygon approximation apparatus for the contour and the method thereof according to the present invention, the first region is a region located from a predetermined vertex to a contour pixel that is sequentially determined for vertex extraction, and the second region is an expanded region from the first region to a predetermined contour pixel.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a view illustrating a process of performing the sequential polygon approximation for the contour according to the present invention.

DETAILED DESCRIPTION OF THE INVENTION

Figure 2:
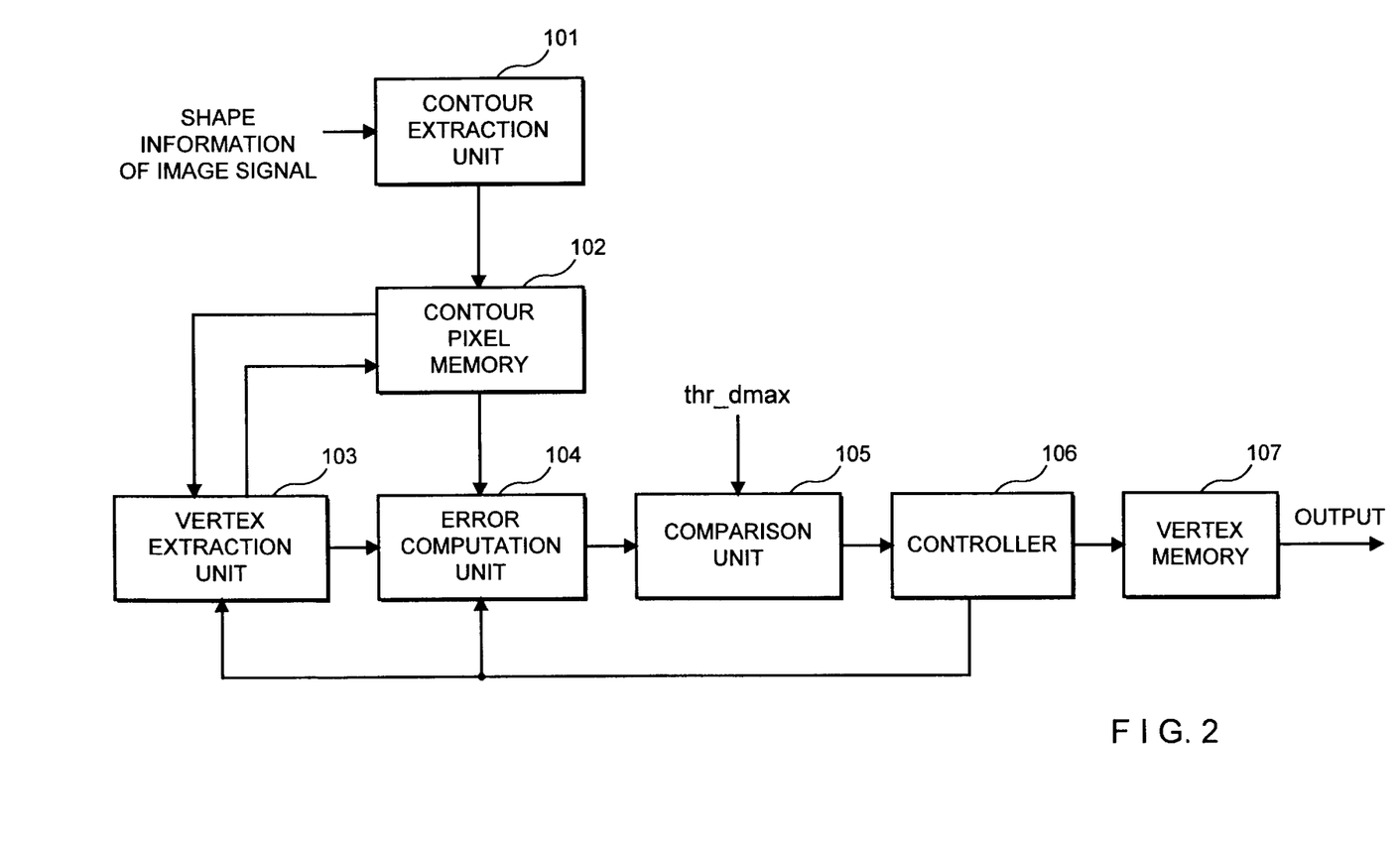
FIG. 2 is a block diagram illustrating a sequential polygon approximation apparatus for a contour according to the present invention.

FIG. 2 is a block diagram illustrating a sequential polygon approximation apparatus for a contour according to the present invention.

As shown therein, in FIG. 2, the sequential polygon approximation apparatus includes a contour extraction unit 101 connected for extracting a contour for a shape information coding when shape information of an image signal is to be polygonal-approximated is inputted; a contour pixel memory 102 connected for storing a position information of a contour pixel in the order of a connection of the contour extracted by the contour extraction unit 101; a vertex extraction unit 103 for receiving the contour pixel from the contour pixel memory 102 and outputting two contour pixels which are necessary to draw a virtual straight line; an error computation unit 104 for receiving from the contour pixel memory a contour pixel between the two contour pixels outputted from the vertex extraction unit 103, and computing an error, namely a distance between the inputted contour pixel and the virtual straight line between the two contour pixels outputted from the vertex extracting unit 103; a comparison unit 105 for comparing a distance obtained by the error computation unit 104 and a threshold value (thrdmax) provided by an user; a controller 106 for controlling the vertex extraction unit 103 and the error computation unit 104 according to a comparison result of the comparison unit 105, setting a pixel just before a final pixel of a first region as a first vertex when a distance obtained in the first region is greater than the threshold value, setting a corresponding contour pixel as the final vertex when distances obtained in a second region are all smaller than or equal to the threshold value, and setting the first vertex as the final vertex when any of the distances obtained in the second region is not smaller than or equal to the threshold value; and a vertex memory 107 for storing the vertexes set by the controller 106.

Here, the first region is the region for extracting the first vertex. Namely, it denotes the region to the contour pixel which is determined in order for the vertex extraction from one fixed vertex.

The second region is a region which is expanded to a predetermined contour pixel from the first region for the vertex extraction.

When the shape information of the image signal $I_s$ is inputted, the contour extraction unit 101, the contour pixel position information is stored in the contour pixel memory 102 in the order that the contour is extracted.

Therefore, the position information of the contour pixels, that is, a position of the x-axis direction and a position of the y-axis direction which is to be approximated is stored in the contour pixel memory 102 in the order of the connection of the contour.

In addition, the vertex extraction unit 103 receives a contour pixels input from the contour pixel memory 102 in accordance with the control of two controller 106 and outputs the contour pixels which are necessary to draw the virtual straight line to the error computation unit 104.

The error computation unit 104 receives from the contour pixel memory 102 a contour pixel residing between the two contour pixels outputted from the vertex extraction unit 103 in accordance with the control of the controller 106, and computes a distance between the inputted contour pixel and the virtual straight line between the two contour pixels outputted from the vertex extraction unit 104.

In addition, the comparison unit 105 compares the computed distance from the error computation unit 104 with the threshold value provided by an user.

The controller 106 determines a vertex in accordance with the comparison result of the comparison unit 105.

Namely, as a result of the comparison of the comparison unit 105, the controller 106 determines a contour pixel just before the final pixel of the first region as a first vertex when a distance obtained in the first region is greater than the threshold value.

And, a corresponding contour pixel is determined as the final vertex when distances obtained in the second region are all smaller than or equal to the threshold value, and the first vertex is determined as the final vertex when any of the distances obtained in the second region is not smaller than or equal to the threshold value.

In addition, if all the error obtained in the second region is smaller than the threshold value, the final pixel of the second region is outputted as the final vertex. If at least one error obtained in the second region is not greater than the threshold value, the first vertex is outputted as the final vertex.

The vertexes determined by the controller 106 are stored in the vertex memory 107 and are outputted for a compression coding of the vertex.

Figure 3:
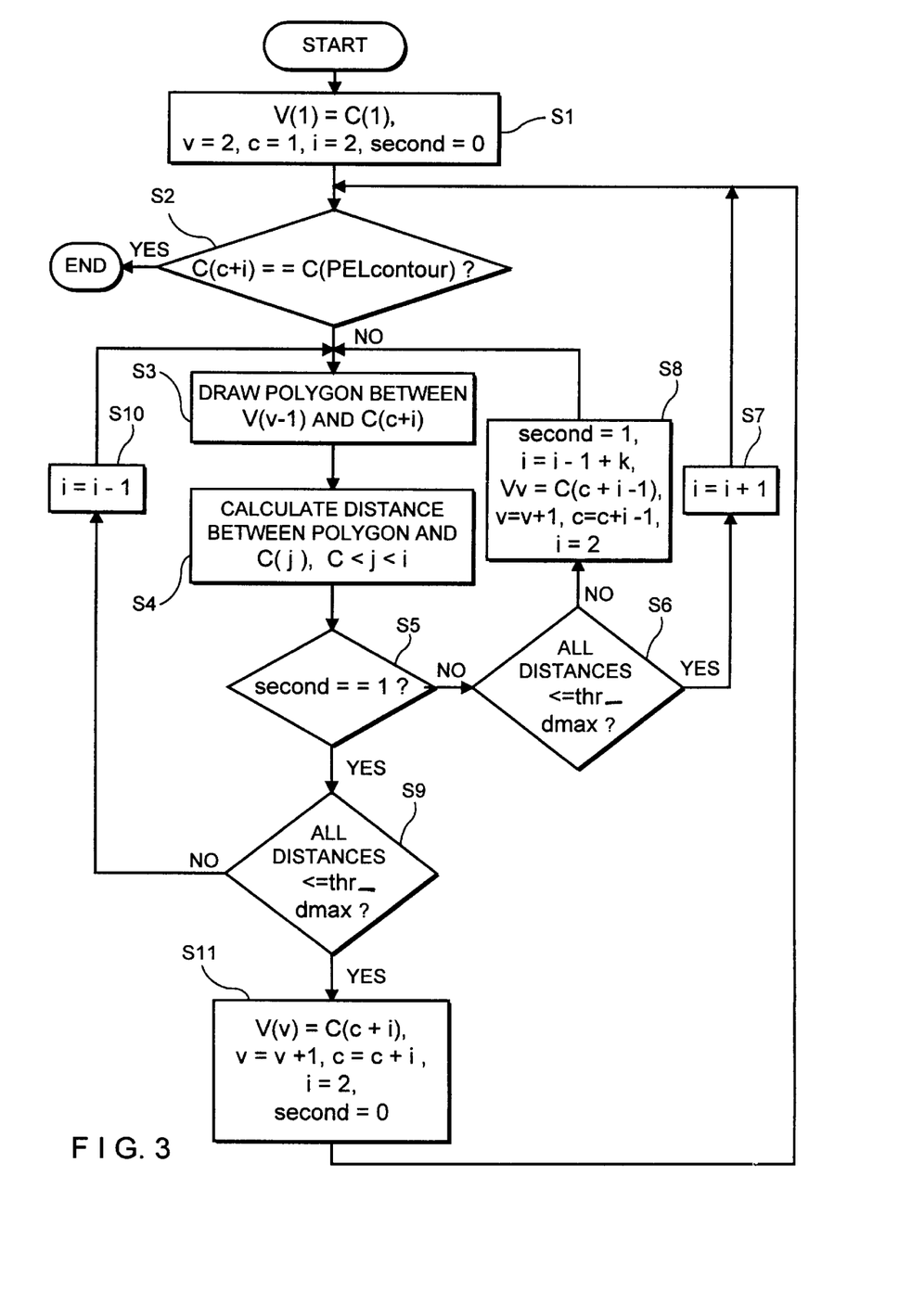
FIG. 3 is a flow chart of a sequential polygon approximation method for a contour according to the present invention.

The present invention will now be explained in more detail with reference to the flow chart in FIG. 3 and the exemplary view in FIG. 7.

Reference numerals in FIG. 3 will now be explained. Reference numerals C(c) and V(v) indicate a c-th contour pixel and a v-th vertex, respectively. Reference numerals c and i indicate the order of the contour pixel. Reference numerals v and PELcontour indicate the order of the vertex, and a number of the contour pixels, respectively.

Therefore, reference numeral C(1) indicates a first contour pixel and reference numeral C(PELcontour) indicates a final pixel. When the given contour is opened, one of the two end points is determined as C(1). In the case that the given contour is closed, a predetermined contour pixel is determined as C(1).

'=' means that a value at the left side is replaced by a value at the right side, and '==' means that the values at the both sides are equal.

First of all, an initialization for the sequential polygon approximation for the contour is carried out. That is, an initial contour pixel CM is determined as an initial vertex V(l), and variables v, c, i are initialized (S1). Then it is confirmed whether a pixel C(c+i) that is newly inputted from the contour pixel memory 102 to the vertex extraction unit 103 is the final pixel C(PELcontour) (S2).

When the inputted pixel is the final pixel in the above-described step (S2), the polygon approximation is completely finished. However, in the case that the inputted pixel is not the final pixel, the virtual straight line is drawn between the selected vertex V(v−1) and the pixel C(c+i).

The vertex extraction unit 103 receives the contour pixels between V(v−1) and C(c+i), namely the contour pixel C(j) (c<j<i) from the contour pixel memory 102, A distance between the inputted contour pixel and the virtual straight line drawn in the third step (S3) is computed (S4).

It is confirmed whether 'second==1' is satisfied (S5). Here, in the case of "second==0", the polygon approximation is carried out in respect of the first region, and in the case of "second==1", the polygon approximation is performed in respect of the second region, Since "second=0" is initialized in the first step (S1), "second==0" is satisfied in the fifth step (S5), and thus the polygon approximation is performed firstly for the first region. That is, the distance computed in the above step (S4) is compared with the given threshold value, and thus it is determined whether the distance is smaller than or equal to the threshold value (S6).

When the distances are all smaller than or equal to the threshold value in the sixth step (S6), the above-described steps (S2, S3, S4, S5, S6) are repeatedly carried out for a next succeeding pixel in the first region such as (i=i+1) (S7). In case any of the distances is greater than the threshold value in the sixth step (S6), a pixel just before the final pixel of the first region is determined as the first vertex (Vv-C(c+i−1), v=v+1, c=c+i−1, i=2), the contour pixel is defined which is separated as far as a predetermined contour pixel from the pixel position of the first vertex (i=i−1+k, k is a value determined by the user), "second=1" is determined (S8), and then the polygon approximation is carried out in the second region, identically to the above-described steps (S3, S4, S5).

Here, k should be smaller than the final contour pixel (PELcontour) of the contour to be polygonal-approximated (min(PELcontour—(c+1), second range).

When "second==1" is confirmed in the fifth step (S5), the distance computed in the fourth step (S4) is compared with the given threshold value, and it is determined whether the distance is smaller than or equal to the threshold value (S9).

In case any of the distances is greater than the threshold value in the ninth step (S9), the above steps (S3, S4, S5, S9) are repeatedly carried out on a next proceeding pixel of the second region such as (i=i−1) in the tenth step (S10).

When the distances are all smaller than or equal to the threshold value in the ninth step (S9), the corresponding contour pixel of the second region is determined as the final vertex (Vv−C(c+i), v=v+1, c=c+i, i−2), and "second-0" is determined (S11), thereby finishing the operation in the second region (S11). Here, when any of the distances to the first vertex is not smaller than or equal to the threshold value, the first vertex is determined as the final vertex.

Namely, in the polygonal approximation of the present invention, since the maximum distance of the actual contour is almost identical to the given threshold value, the number of vertexes are reduced compared to the conventional polygonal approximation.

The sequential polygon approximation for the contour will now be described in more detail with reference to the exemplary view in FIG. 7. A black circle is a pre-selected vertex, and the vertex extraction unit 103 receives a vertex after two vertexes from the black vertex from the contour pixel memory 102.

Then, the vertex extraction unit 103 outputs to the error computation unit 104 the contour pixel of the black vertex and the two contour pixels inputted from the contour pixel memory 102. The error computation unit 104 receives from the contour pixel memory 102 the contour pixel between the two contour pixels outputted from the vertex extraction unit 103, namely a first contour pixel from the black vertex, as illustrated in (A).

A distance between the virtual straight line connecting the two contour pixels outputted from the vertex extraction unit 103 and the contour pixel inputted from the contour pixel memory 102 is computed, and outputted to the comparison unit 105.

The comparison unit 105 serves to compare a distance between the contour pixel outputted from the error computation unit 104 and the virtual straight line with the threshold value.

In the case that the distance is smaller than or equal to the threshold value, the controller 106 transfers the information to the vertex extraction unit 103, the error computation unit 104 and the comparison unit 105, and repeatedly carries out the above steps.

That is, in the case of (A), when it is presumed that the distance is smaller than or equal to the threshold value, the vertex extraction unit 103 receives a next succeeding contour pixel of the contour pixel which is read ahead, namely a third vertex from the black vertex from the contour pixel memory 102, and outputs the black vertex and the two newly inputted contour pixels of the third vertex to the error computation unit 104.

As discussed earlier, the error computation unit 104 receives all the contour pixels between the two inputted contour pixels from the contour pixel memory 102 (in the case of (B), there are two contour pixels between the black vertex and the third vertex).

And, as shown in (B), the distance between the virtual straight line and the contour pixel between the black vertex and the third vertex is computed, and compared with the threshold value by the comparison unit 105.

In the case of (B), when the distances are all smaller than or equal to the threshold value, (C) and (D) are carried out by the identical method, and the control thereof is performed by the control unit 106.

When any of the distances computed by the error computation unit 104 is greater than the threshold value, the contour pixel just before the vertex connecting the black vertex and the straight ling, namely a square-type contour pixel is determined as the first vertex. According to the present invention, a set of the contour pixels from a pre-selected vertex to the first vertex is the first region. After the first vertex is selected, the vertex extraction unit 103 receives from the contour pixel memory 102 a contour pixel of the predetermined order, namely as far as "k" from the first vertex, and outputs the contour pixel together with the black vertex to the error computation unit 104.

According to the present invention, a set of the contour pixels between the contour pixel after the first vertex and the contour pixel located as far as "k" from the first vertex is the second region.

In the case of (E), when the pixel located as far as "k=5" from the first vertex, the error computation unit 104 receives from the contour pixel memory 102 the contour pixels between the above contour pixel and the contour pixel of the black vertex, and computes the distance from the inputted contour pixels to the virtual straight line between the two vertexes outputted from the vertex extraction unit 103, and outputs the result to comparison unit 105.

The comparison unit 105 compares the inputted distance with the threshold value, and when any of the distances is greater than the threshold value, the above operations are repeatedly carried out.

That is, as illustrated in (F), the vertex extraction unit 103 receives the pixel just before the final pixel in the second region from the contour pixel memory 102, and repeatedly carries out the above operations.

When the distances which are inputted to the comparison unit 105 by the repeated operations are all smaller than or equal to the threshold value, the pixel in the second region connecting the black vertex and the straight line is selected as a new vertex, that is a black square is selected in the case of (F), Here, when any of the distances is not smaller than or equal to the threshold value, the first vertex is selected as the final vertex, and stored in the vertex memory 107.

Figure 4:
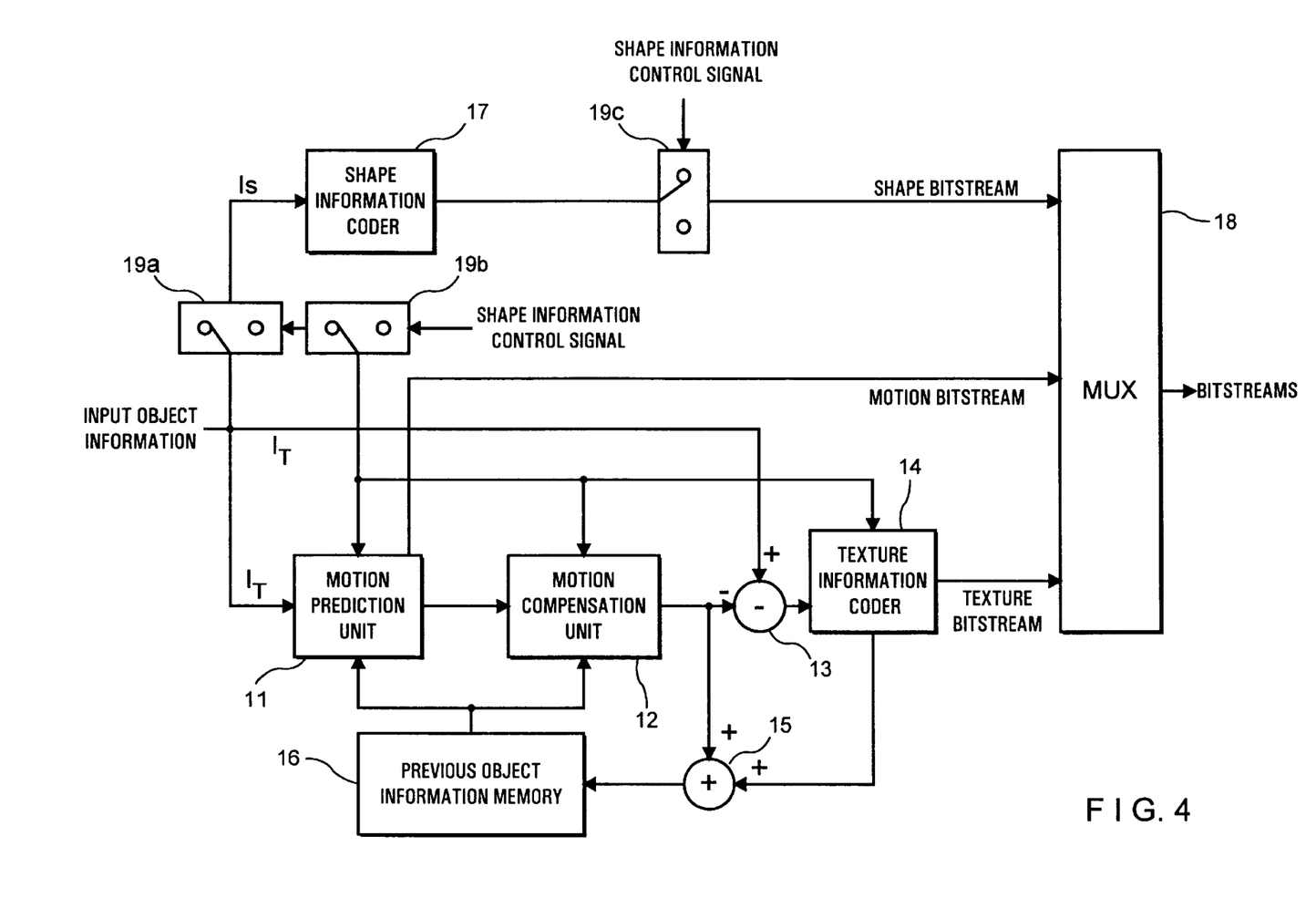
FIG. 4 is a block diagram illustrating a VOD coder of a VM encoder which was firstly recommended by IEEE.

The present invention is well in compliance with the VOP coding of the VM encoder which was firstly decided by the IEEE as shown in FIG. 4. Namely, it is adapted to the VOP (VOP of arbitrary shape=1) of a predetermined shape. The operation thereof is as follows.

The object information is divided into the shape information of an object is and the texture information of a pixel in the object IT, the information being inputted to a shape information coding unit 17 and a movement estimation unit 11, respectively.

The shape information coding unit 17 codes the shape information of the corresponding object, and makes shape information bit rows and reproduction shape information to be transmitted to the receiving unit.

The reproduction shape information is inputted to the movement estimation unit 11, a movement compensation unit 12 and a texture information coding unit 14, and used to perform the operations thereof in the unit of objects. That is, the operations are carried out on the pixels merely in the object. The shape information bit row which is another output from the shape information coding unit 17 is inputted to a multiplex unit 18. The movement estimation unit 11 detects the movement information of $I_T$ by using the input texture information of a current object and the texture information of a preceding object stored in a preceding object information memory 16, namely a reference object employed during the coding of the current object which is pre-coded. The detected movement information is inputted to the movement compensation unit 12 in order to predict movement compensation.

The estimated movement information is compressively coded, and the movement information bit row is inputted to the multiplex unit 18. The movement compensation unit 12 serves to predict the movement compensation by using the movement information obtained from the movement estimation unit 11 and the preceding object texture information of the preceding object information memory 16.

A subtraction unit 13 obtains a difference between $I_T$ and the movement compensation prediction texture information obtained in the movement compensation unit 12, namely a prediction error.

The texture information coding unit 14 codes the signal, and generates and output the texture information bit row to the multiplex unit 18. A reproduced prediction error signal is inputted to the subtraction unit 15, and then the subtraction unit 15 generates a reproduction texture information signal of a corresponding object by adding the movement compensation prediction signal to the reproduced error signal. The signal is stored in the preceding object information memory 16 and used for coding a next inputted object.

The multiplex unit 18 varies and transmits to the receiving unit a shape information bit raw, a movement information bit row and a texture information bit row which are inputted thereto. Switches 19a, 19b, 19c are controlled by a shape information control signal. The flow of the shape information is intercepted by turning off the switches during a frame unit coding. The shape information coding unit and reproduction shape control signal are operated by turning on the switches during an object unit coding, as described above.

Figure 5:
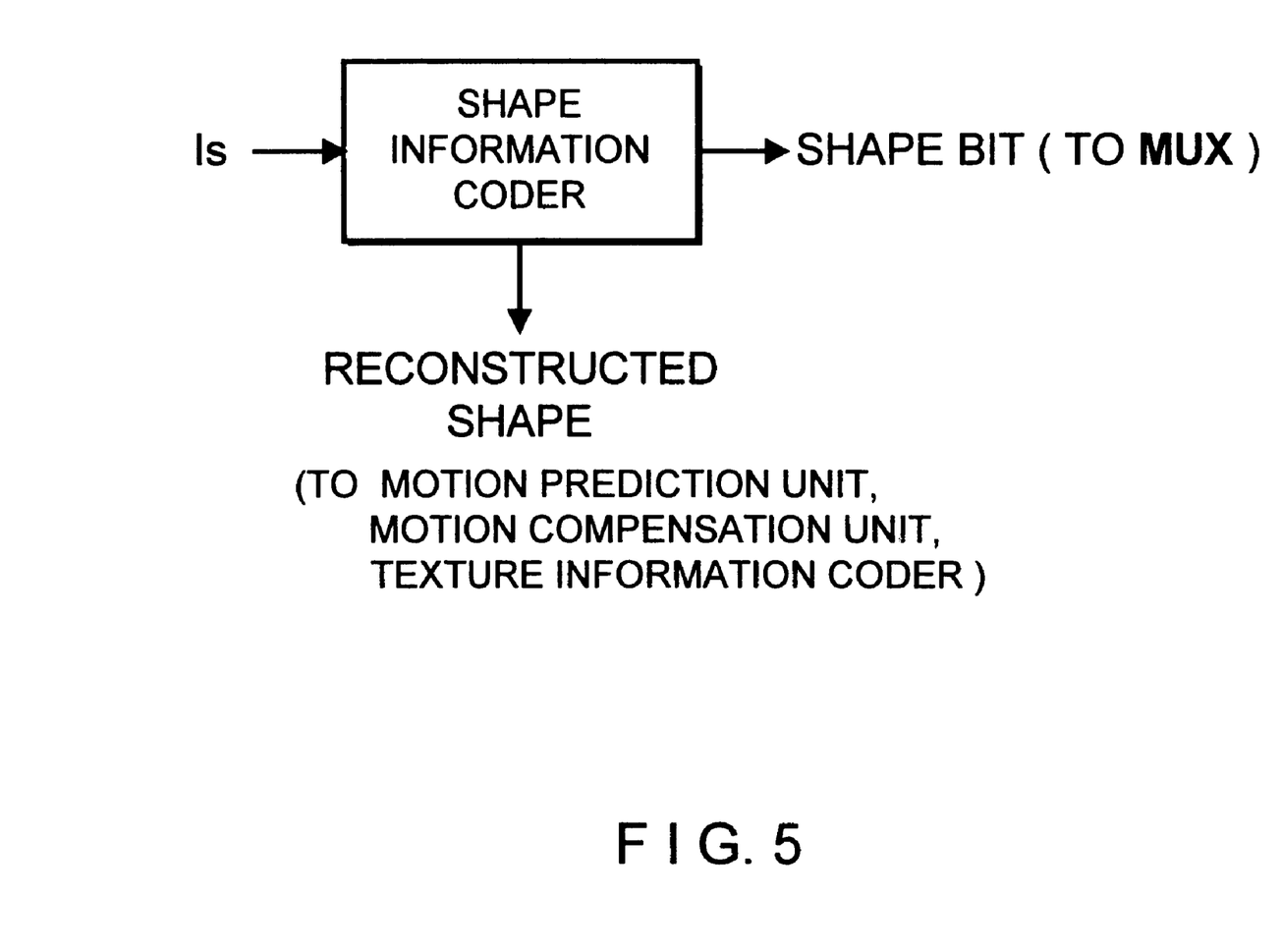
FIG. 5 is a view illustrating an input/output state of a shape information coder of FIG. 4 according to the present invention.
Figure 6:
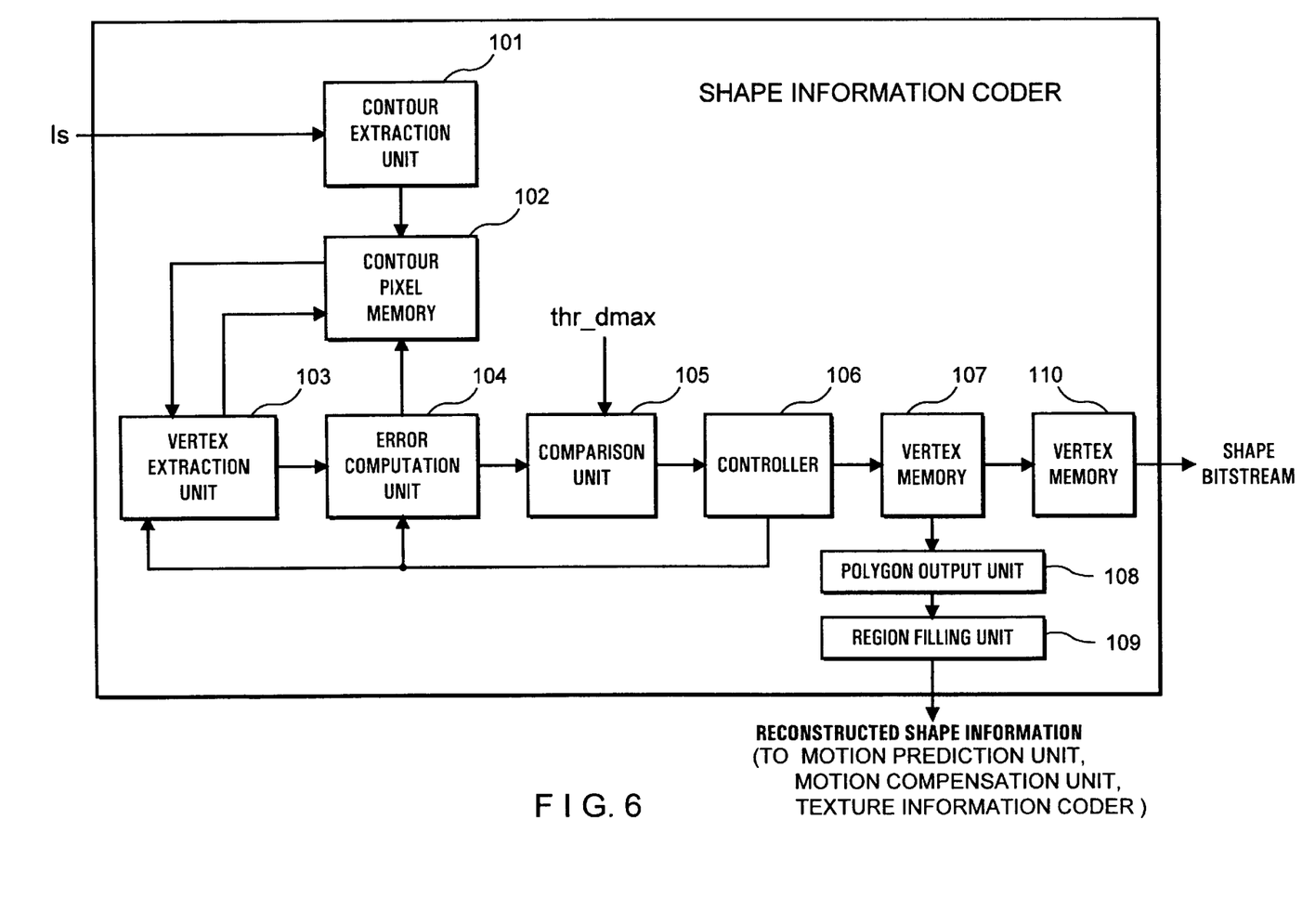
FIG. 6 is a block diagram when a shape information coder is adapted to the present invention.

In addition, the present invention is well adaptable to the shape information coder 17. FIG. 5 illustrates an input/output state of the shape information coder 17. FIG. 6 illustrates the application to the shape information coder 17.

As shown therein, in the contour extraction unit 101, the shape information $I_S$ is inputted from the input VOP, and the contour is extracted, and each of the components 102 through 106 extracts the vertex from the contour as shown in FIG. 2 and is stored in the vertex memory 107.

Each vertex stored in the vertex memory 107 is inputted to the polygonal output unit 108, and a straight line is connected between vertexes, for thus obtaining a polygonal line.

In addition, a region filling unit 109 defines a predetermined region by using the output signal from the polygonal output unit 108 and the inner portion of the polygonal region.

In addition, the vertex coder 110 compress-codes the vertex stored in the vertex memory 107 so as to transmit the extracted vertex to a receiving terminal.

Meanwhile, for the polygonal approximation, two threshold values are available. Of which, on is referred to the effective maximum distance between the actual contour and the polygonal straight line, and the other is referred to the number of vertexes.

When the threshold value is given as the number of vertexes, the polygonal approximation is performed until the number of vertexes is fixed.

If the threshold value is given as the effective maximum distance between the actual contour and the polygonal straight line, it is possible to control the accuracy of the polygonal approximation. If the threshold value is given as the number of the vertexes, it is possible to easily control the amount of data.

As described above, the sequential polygon approximation apparatus for a contour and a method thereof according to the present invention are directed to determining the vertexes in the order of the pixels of the given contour and performing a polygonal approximation with respect thereto, for thus reducing the number of vertexes, so that it is possible to reduce the amount of data to be transmitted.

In addition, when coding the shape information of the object in the object-oriented coding, since this information is visually important, the accuracy is more important than the number of the vertexes. In this case, since the polygonal approximation is given as a threshold value, it is possible to obtain a higher coding gain compared to the conventional method.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A sequential polygon approximation apparatus for a contour, comprising:

a contour extraction unit for extracting a contour from shape information of an input image signal;

a contour pixel memory for storing position information of a contour pixel in the order of a connection of the contour extracted by the contour extracting unit;

a vertex extraction unit for receiving the contour pixel from the contour pixel memory and outputting two contour pixels which are necessary to draw a virtual straight line;

an error computation unit for receiving from the contour pixel memory a contour pixel between the two contour pixels outputted from the vertex extraction unit, and computing a distance between the inputted contour pixel and the virtual straight line between the two contour pixels outputted from the vertex extracting unit;

a comparison unit for comparing the distance obtained by the error computation unit and a threshold value provided by an user;

a controller for controlling the vertex extraction unit and the error computation unit according to a comparison result of the comparison unit, setting a pixel just before a final pixel of a first region as a first vertex when a distance obtained in the first region is greater than the threshold value, setting a corresponding contour pixel as the final vertex when distances obtained in a second region are all smaller than or equal to the threshold value, and setting the first vertex as the final vertex when any of the distances obtained in the second region is not smaller than or equal to the threshold value; and a vertex memory for storing the vertexes set by the controller.

2. The apparatus of claim 1, wherein said threshold value is determined based on the effective maximum distance between the actual contour and the polygonal straight.

3. The apparatus of claim 1, wherein said threshold value is given as the number of vertexes.

4. A method of a sequential polygon approximation for a contour, comprising the steps of:

a first step for determining a first vertex by carrying out an initialization;

a second step for determining whether a pixel inputted from a contour pixel memory to a vertex extraction unit is a final pixel, after the initialization;

a third step for finishing a polygon approximation when the pixel is the final pixel in the second step, or receiving from the contour pixel memory the contour pixel positioned after two contour pixels from the first vertex which is determined in the first step;

a fourth step for drawing a virtual straight line between the contour pixel inputted in the third step and the first vertex;

a fifth step for receiving a contour pixel between the first vertex determined in the first step and the contour pixel inputted from the contour pixel memory in the third step, and computing a distance between the inputted contour pixel and the virtual straight line drawn in the fourth step;

a sixth step for confirming whether the polygon approximation that has been carried out in respect of a first region or a second region;

a seventh step for comparing the distance computed in the fifth step with the threshold value by the comparison unit when the polygon approximation relates to the first region;

an eight step for receiving a next succeeding contour pixel from the contour pixel memory and repeatedly carrying out the above steps from the fourth step when the distance is smaller than or equal to the threshold value in the seventh step, and determining as the first vertex a contour pixel lust before the pixel connected to the first vertex by the straight line and defining a second region including contour pixels between a pixel position of the first vertex and a predetermined contour pixel from the first vertex, when the distance is greater than the threshold value;

a ninth step for inputting the final pixel of the second region from the contour pixel memory to the vertex extraction unit when the polygon approximation relates to the second region in the sixth or eight step;

a tenth step for drawing a virtual straight line between the final pixel inputted in the ninth step and the first vertex of the first region;

an eleventh step for receiving from the contour pixel memory all contour pixels between the first vertex of the first region and the final contour pixel inputted from the contour pixel memory in the tenth step, and computing a distance between the inputted contour pixels and the virtual straight line drawn in the tenth step by the error computation unit;

a twelfth step for comparing the distance computed by the comparison unit in the ninth step with the threshold value; and a thirteenth step for receiving from the contour pixel memory a pixel lust before the final pixel of the second region when any of the distances is greater than the threshold value, and repeatedly carrying out the above steps from the tenth step, determining as the final vertex a pixel of the second region connected to the first vertex by a straight line when the distances are all smaller than or equal to the threshold value, and determining the first vertex of the first region as the final vertex and storing it in the vertex memory when any of the distances to the first vertex is not smaller than or equal to the threshold value.

5. The method of claim 4, wherein when the given contour is an open contour, one of both ends of the open contour is determined as a first vertex.

6. The method of claim 4, wherein when the given contour is a closed contour, a predetermined pixel of pixels of the closed contour is determined as a first vertex.

7. The method of claim 4 wherein said threshold value is determined as an effective maximum distance between an actual contour and a polygonal straight line.

8. The method of claim 4, wherein said threshold value is given as the number of vertexes.

9. The method of claim 4, wherein said first region is a region which is sequentially determined so as to extract a vertex, and said second region is a region expanded to a predetermined contour pixel from the first region so as to extract a vertex.

* * * * *